(12) United States Patent
Ulaganathan et al.

(10) Patent No.: US 11,762,666 B2
(45) Date of Patent: Sep. 19, 2023

(54) METHODS AND APPARATUS FOR HYPERVISOR BOOT UP

(71) Applicant: Walmart Apollo, LLC, Bentonville, AR (US)

(72) Inventors: Satheesh Kumar Ulaganathan, Sunnyvale, CA (US); Tom Jose Kalapura, Mountain House, CA (US); Jimmy McCroy, San Francisco, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 131 days.

(21) Appl. No.: 16/260,625

(22) Filed: Jan. 29, 2019

(65) Prior Publication Data

US 2020/0241889 A1  Jul. 30, 2020

(51) Int. Cl.
*G06F 9/4401* (2018.01)
*G06F 9/455* (2018.01)
*G06F 8/61* (2018.01)

(52) U.S. Cl.
CPC .............. *G06F 9/4416* (2013.01); *G06F 8/63* (2013.01); *G06F 9/4406* (2013.01); *G06F 9/45558* (2013.01); *G06F 2009/4557* (2013.01); *G06F 2009/45579* (2013.01); *G06F 2009/45595* (2013.01)

(58) Field of Classification Search
CPC ...... G06F 9/4416; G06F 9/445; G06F 9/4406; G06F 8/63; G06F 2009/45562; G06F 2009/45579
See application file for complete search history.

(56) References Cited

U.S. PATENT DOCUMENTS

| | | | |
|---|---|---|---|
| 6,356,965 B1 * | 3/2002 | Broyles | G06F 9/4408 709/220 |
| 2004/0163008 A1 * | 8/2004 | Kim | H04L 69/40 714/4.1 |
| 2005/0278583 A1 * | 12/2005 | Lennert | G06F 11/1469 714/E11.122 |
| 2006/0242228 A1 * | 10/2006 | Eggers | H04L 67/02 709/203 |
| 2008/0082809 A1 * | 4/2008 | Rothman | G06F 9/4416 713/1 |

(Continued)

*Primary Examiner* — Jaweed A Abbaszadeh
*Assistant Examiner* — Hyun Soo Kim
(74) *Attorney, Agent, or Firm* — Morgan, Lewis & Bockius LLP; Manita Rawat (57) ABSTRACT

This application relates to apparatus and methods for booting servers, such as cloud datacenter compute servers. The servers may execute one or more hypervisors, such as stateless hypervisors, with each hypervisor supporting one or more virtual machines. In some examples, each of a plurality of servers are configured to boot from a network. The compute servers may obtain an IP address identifying a location of hypervisor bootable images. Upon a reboot, the servers may request and obtain a hypervisor bootable image from the IP address. The servers may execute the hypervisor bootable image to run a hypervisor. In some examples, the servers also obtain virtual machine images from the network. One or more hypervisors executing on each server may obtain, and execute, one or more of the virtual machine images to run one or more virtual machines.

15 Claims, 6 Drawing Sheets

(56) References Cited

U.S. PATENT DOCUMENTS

| | | | |
|---|---|---|---|
| 2009/0172381 A1* | 7/2009 | Zimmer | G06F 9/4401 713/2 |
| 2013/0279378 A1* | 10/2013 | Niea | H04B 3/36 370/293 |
| 2014/0282815 A1* | 9/2014 | Cockrell | H04L 63/20 726/1 |
| 2014/0317394 A1* | 10/2014 | Buhler | G06F 9/4416 713/2 |
| 2014/0365561 A1* | 12/2014 | Meyer | H04L 67/18 709/203 |
| 2016/0248620 A1* | 8/2016 | Itkin | H04L 41/04 |
| 2017/0139729 A1* | 5/2017 | Cropper | G06F 9/45558 |
| 2017/0208004 A1* | 7/2017 | Tripathi | H04L 47/20 |

\* cited by examiner

METHODS AND APPARATUS FOR HYPERVISOR BOOT UP

TECHNICAL FIELD

The disclosure relates generally to data systems that employ servers and, more specifically, to booting servers that execute hypervisors in the data systems.

BACKGROUND

Some datacenters, such as cloud datacenters, may employ multiple servers to handle various data processing tasks. For example, a cloud datacenter may employ hundreds of compute servers to process large amounts of data. Datacenters may also include data storage capabilities, such as memory devices that allow for the storage of data, and networking resources that allow for communication among and with the servers. In some datacenter examples, servers may execute one or more hypervisors that run one or more virtual machines (VMs). To manage the datacenter including the various servers, some data systems employ software tools such as Openstack®.

Sometimes, a server must be reboot for one or more reasons. For example, the server may need to be reboot to install upgrades of software, such as an Openstack® upgrade, a kernel upgrade, or a security patch upgrade. However, the reboot of a server has drawbacks. For example, the server may not be available for service during the reboot. In addition, the reboot process may involve the execution of multiple tasks, each of which must complete before the next task can begin. For example, servers may need to restart hypervisors and the virtual machines they run. In some examples, multiple, if not all, servers of a datacenter may need to be reboot. In some examples, the servers are reboot one at a time so as to minimize disruption to the datacenter. Because the servers are rebooted serially, the reboot process may take a long amount of time (e.g., hours or even days) before all the servers have been rebooted. As such, there are opportunities to address problems associated with conventional server bootup.

SUMMARY

The embodiments described herein are directed to booting servers that execute hypervisors, such as stateless hypervisors, in a datacenter. The embodiments may allow for software upgrades to be performed in a controllable, automated fashion. The embodiments may allow, for example, for faster upgrades of hypervisors executing on compute servers. In some examples, the embodiments may allow for more frequent upgrades, such as Openstack®, kernel, or security patch upgrades.

In accordance with various embodiments, exemplary systems may be implemented in any suitable hardware or hardware and software, such as in any suitable computing device. For example, in some embodiments, a computing device is configured to generate a bootable image. The bootable image may be a hypervisor bootable image. The computing device may be configured to store the bootable image in a storage device, such as a non-volatile memory. The computing device may also be configured to configure a plurality of servers to boot from a network and to obtain, at boot up, the bootable image stored in the storage device. For example, the computing device may transmit a network boot command to the plurality of servers that includes a boot setting to boot from a network, and a network address from which to obtain the bootable image at boot up. The computing device may also be configured to reboot the plurality of servers, where rebooting the plurality of servers causes the plurality of servers to execute the bootable image. For example, the computing device may transmit a reboot command to the plurality of servers.

In some embodiments, a method is provided that includes generating a bootable image. In some examples, the generated bootable image is a hypervisor bootable image. The method may also include storing the bootable image in a storage device, such as a non-volatile memory. The method may further include configuring a plurality of servers to boot from a network and to obtain, at boot up, the bootable image stored in the storage device. For example, the method may include transmitting a network boot command to the plurality of servers that includes a boot setting to boot from a network, and a network address from which to obtain the bootable image at boot up. The method may also include rebooting the plurality of servers, where rebooting the plurality of servers causes the plurality of servers to execute the bootable image. For example, the method may include transmitting a reboot command to the plurality of servers.

In yet other embodiments, a non-transitory computer readable medium has instructions stored thereon, where the instructions, when executed by at least one processor, cause a computing device to perform operations that include generating a bootable image. In some examples, the generated bootable image is a hypervisor bootable image. The operations may also include storing the bootable image in a storage device, such as a non-volatile memory. The operations may further include configuring a plurality of servers to boot from a network and to obtain, at boot up, the bootable image stored in the storage device. For example, the operations may include transmitting a network boot command to the plurality of servers that includes a boot setting to boot from a network, and a network address from which to obtain the bootable image at boot up. The operations may also include rebooting the plurality of servers, where rebooting the plurality of servers causes the plurality of servers to execute the bootable image. For example, the operations may include transmitting a reboot command to the plurality of servers.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Figure 1:
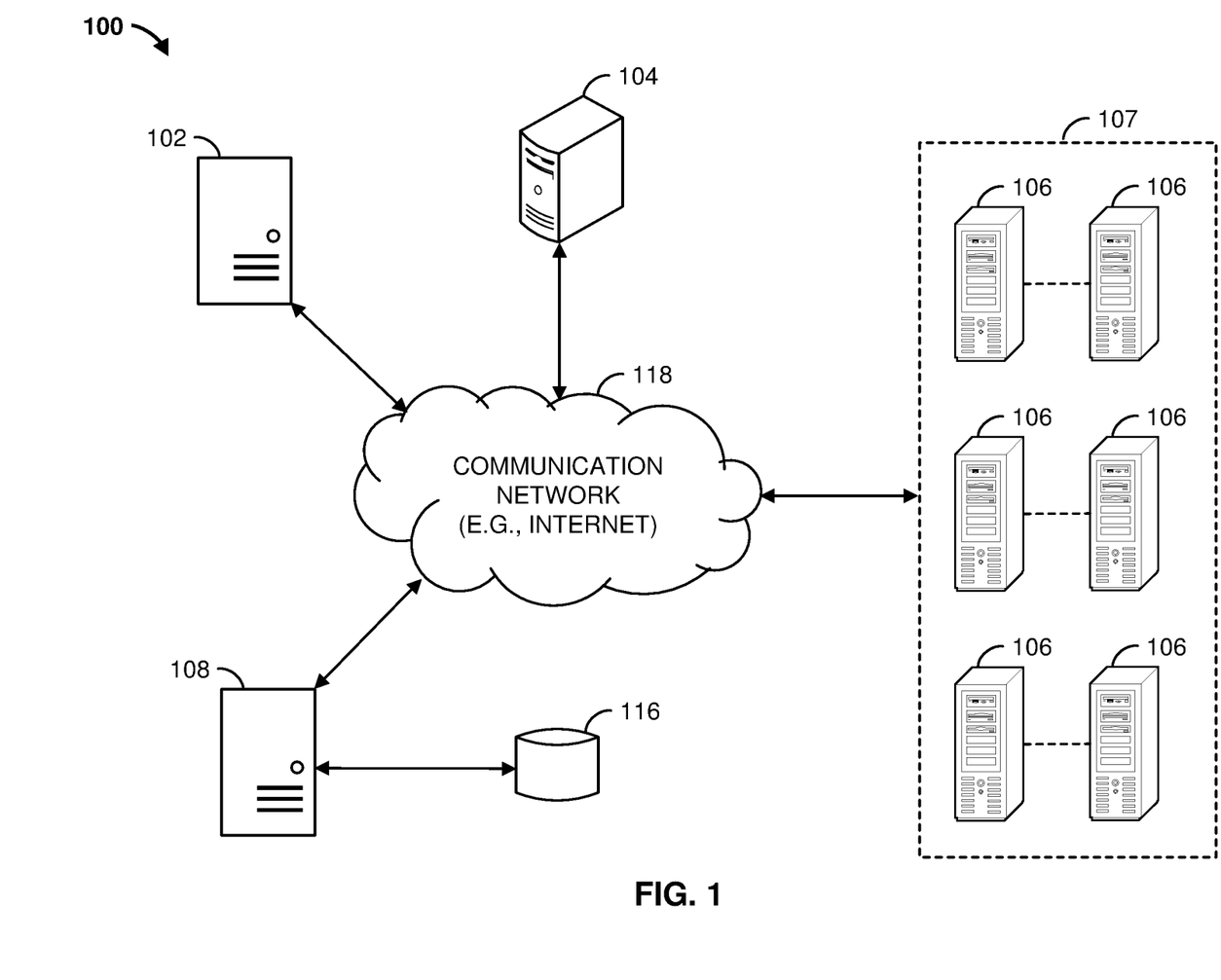
FIG. 1 is a block diagram of a data system that provides bootable images to servers in accordance with some embodiments.

Turning to the drawings, FIG. 1 illustrates a block diagram of a data system 100 that includes a control server 102, web server 104, boot image server 108 operatively coupled to database 116, and compute servers 106 communicatively coupled over network 118. Compute servers 106 may be part of a cloud datacenter 107, for example. Control computing device 102, web server 104, boot image server 108, and compute servers 106 can each be any suitable computing device that includes any hardware or hardware and software combination for processing and handling information. For example, any of control server 102, web server 104, boot image server 108, and compute servers 106 can be a computer, a workstation, a laptop, a server such as a cloud-based server, a smartphone, or any other suitable device. In addition, each can transmit data to, and receive data from, communication network 118.

Additionally, each of control server 102, web server 104, boot image server 108, and compute servers 106 can include one or more processors, one or more field-programmable gate arrays (FPGAs), one or more application-specific integrated circuits (ASICs), one or more state machines, digital circuitry, or any other suitable circuitry. Although FIG. 1 illustrates six computer servers 106, data system 100 can include any number of compute severs 106. Similarly, data system 100 can include any number of control servers 102, web servers 104, boot image servers 108, and databases 116.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

In some examples, web server 104 is a Domain Name System (DNS) server, and may provide an internet protocol (IP) address associated with a requested hostname. In some examples, web server 104 is a Dynamic Host Configuration Protocol (DHCP) server, and may provide an IP address of web server 104. For example, web server 104 may receive from a compute server 106 a request for an IP address of a website hosted by boot image server 108.

In some examples, boot image server 108 is a stateless web server. Boot image server 108 is operable to communicate with database 116. For example, boot image server 108 can store data to, and read data from, database 116.

Database 116 can be any suitable non-volatile memory, such as a remote storage device, a cloud-based server, a memory device on another application server, a networked computer, or any other suitable non-transitory data storage device. In some examples, database 116 can be a local storage device, such as a hard drive, a non-volatile memory, or a USB stick. In some examples, database 116 may be an object storage server. Database 116 may store one or more bootable images, such as a hypervisor bootable image that may be executed by a processor of compute server 106.

Each of compute servers 106 may run one or more hypervisors that execute one or more virtual machines. Compute servers 106 may be operable to obtain one or more bootable images from boot image server 108. For example, compute server 106 may request a hypervisor image from boot image server 108. In response, boot image server 108 may obtain the hypervisor image from database 116, and transmit it to compute server 106. In some examples, computer server 106 obtains the IP address of boot image server 108 from web server 104. For example, compute server 106 may have access to a file, such as a configuration file, that includes a hostname from where to obtain a hypervisor image. Compute server 106 may transmit a DNS request to web server 104 for the hostname. Web server 104 may identify an IP address associated with the received hostname, and transmit a DNS response to computer server 106 that includes the associated IP address. The associated IP address may be, for example, the IP address of boot image server 108. Compute server 106 may extract the IP address from the DNS response, and transmit a request to boot image server 108 at the extracted IP address for a bootable image. For example, compute server 106 may request from boot image server 108 a bootable hypervisor image.

In some examples, compute server 106 executes the bootable image. The bootable image may include, for example, a kernel image and an operating system (OS) image. In some examples, compute server 106 requests the bootable image on every reboot. In some examples, upon successfully receiving a bootable image, compute server 106 may locally store the bootable image in non-volatile memory. Compute server 106 may execute the locally stored bootable image if it is unable to obtain a bootable image from boot image server 108. For example, the locally stored bootable image may act as a failover image, such that if compute server 106 is unable to obtain a bootable image from boot image server 108 (e.g., after unsuccessfully attempting to download the bootable image a threshold number of times), compute server 106 fails over and boots the locally stored image.

Control server 102 may be operable to control and manage compute servers 106 of cloud datacenter 107. Control server 102 may employ software that facilitates for the control of compute servers 106, such as Openstack®. For example, control server 102 may be operable to transmit messages (e.g., commands, requests) to compute servers 106, and to receive messages (e.g., responses, status updates) from compute servers 106. In some examples, control server 102 transmits a configuration file to compute servers 106. The configuration file may include, for example, a command (e.g., setting) to have the compute servers 106 execute a network boot at reboot. The configuration file may also specify a hostname associated with bootable image files, such as bootable hypervisor images, which compute servers 106 are to obtain for the network boot. Compute servers 106 may obtain the IP address associated with the hostname by transmitting a DNS request to web server 104.

Figure 2:
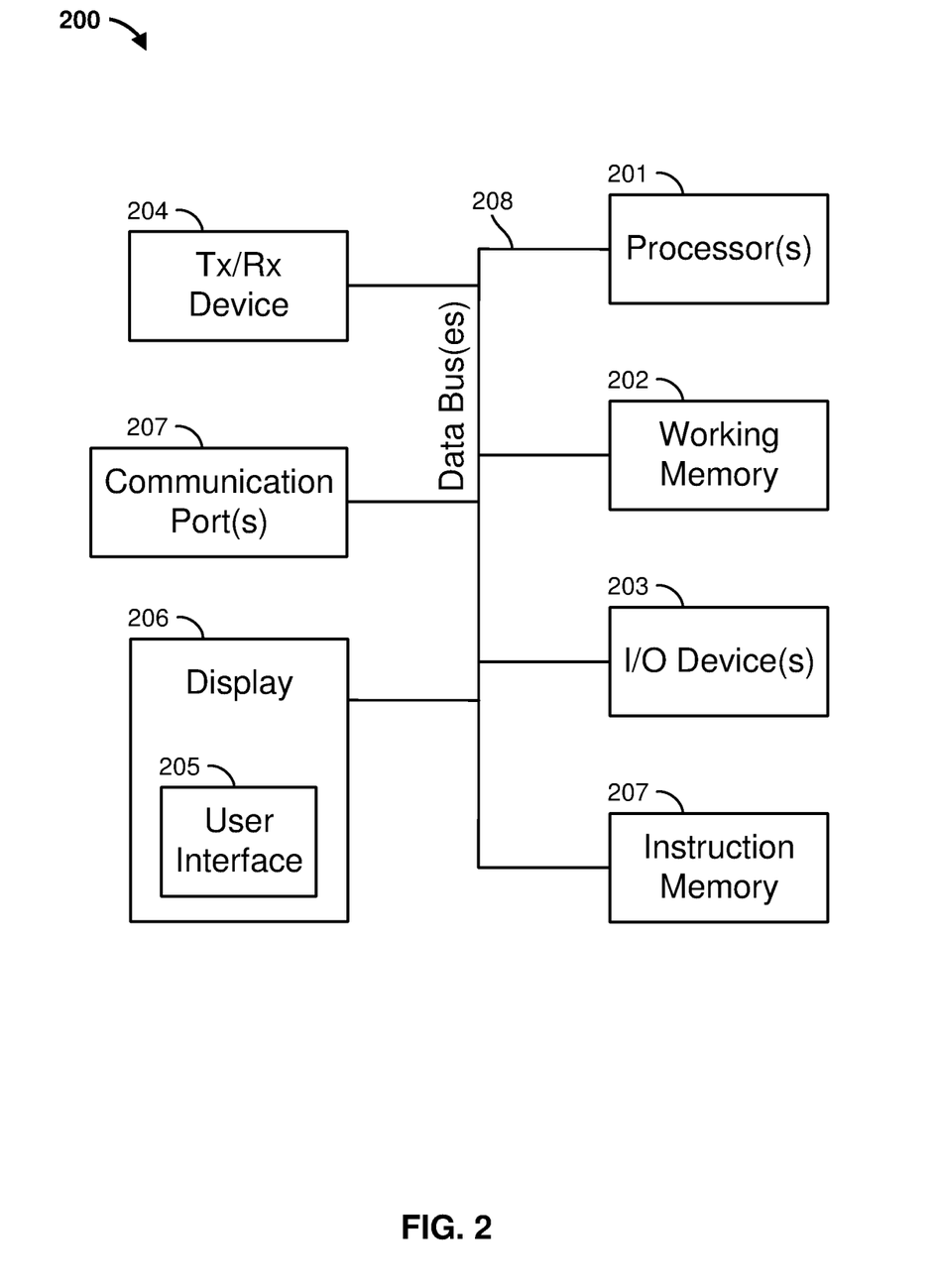
FIG. 2 is a block diagram of an example computing device of the data system of FIG. 1 in accordance with some embodiments.

FIG. 2 illustrates the control server 102 of FIG. 1. Control server 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of control server 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 207 can include, for example, a serial port such as a universal asynchronous receiver/transmitter (UART) connection, a Universal Serial Bus (USB) connection, or any other suitable communication port or connection. In some examples, communication port(s) 207 allows for the programming of executable instructions in instruction memory 207. In some examples, communication port(s) 207 allow for the transfer (e.g., uploading or downloading) of data, such as bootable image files.

Display 206 can display user interface 205. User interfaces 205 can enable user interaction with control server 102. For example, user interface 205 can be a user interface for an application of a retailer that allows a customer to initiate the return of an item to the retailer. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 control server 102 will be operating in. Processor(s) 201 is operable to receive data from, or send data to, a network, such as communication network 118 of FIG. 1, via transceiver 204.

Figure 3:
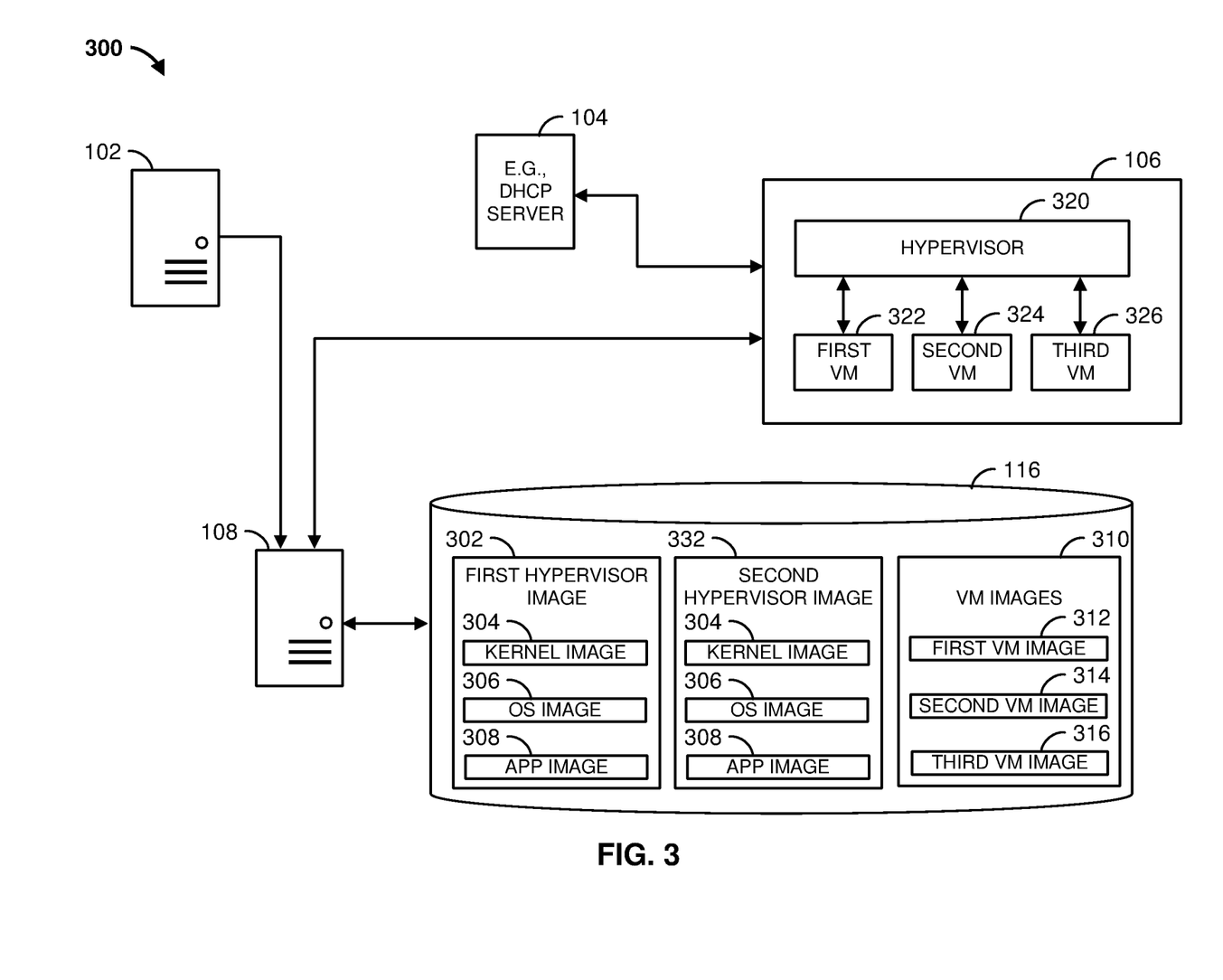
FIG. 3 is a block diagram illustrating examples of various portions of the data system of FIG. 1 in accordance with some embodiments.

FIG. 3 is a block diagram illustrating examples of various portions of the data system 100 of FIG. 1. In this example, control server 102 is operable to generate (e.g., build) a bootable image, such as a hypervisor bootable image. For example, control server 102 may install an operating system and control software such as Openstack®, to build a hypervisor bootable image. Control server 102 may then publish the hypervisor bootable image. For example, control server 102 may transmit the hypervisor bootable image to boot image server 108. Boot image server 108 may store one or more hypervisor bootable images 302, 332 in database 116. In some examples, one or more of hypervisor bootable images 302, 332 may include a kernel image 304, an OS image 306, and one or more application images 308.

Control server 102 may also provide virtual machine images to boot image server 108. For example, the VM images may include updates or fixed to previous VM image versions. Boot image server 108 may store the VM images 310 in database 116. For example, boot image server 108 may store a first VM image 312, a second VM image 314, and a third VM image 316 in database 116. Each VM image may identify a different virtual machine operating system, such as Microsoft®, Linux®, Red Hat®, MacOS®, or any other VM operating system.

Compute server 106 may execute, for example, at least one hypervisor 320, which runs one or more virtual machines. In this example, hypervisor 320 may run first VM 322, second VM 324, and third VM 326. Compute server 106 may be configured for booting from the network (e.g., network boot). For example, upon a reboot, compute server 106 may obtain an IP address from web server 104 associated with a hostname specified in a boot configuration file. The IP address may be the IP address of boot image server 108, for example. Compute server 106 may request one or more bootable images from boot image server 108. For example, compute server 106 may request and obtain hypervisor image 302. Compute server 106 may then parse the received data to determine and execute hypervisor 320.

Figure 4:
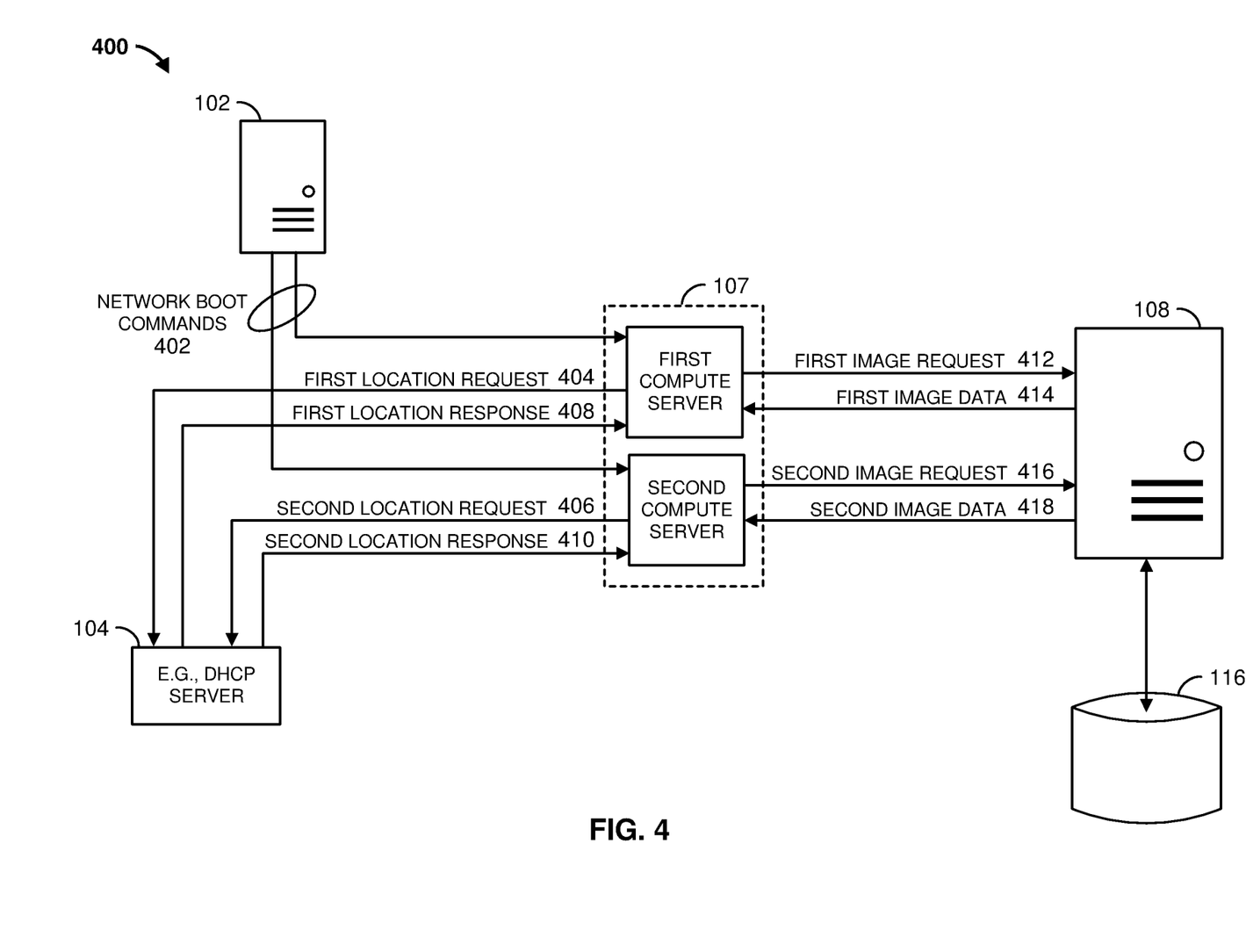
FIG. 4 is a block diagram illustrating examples of communications of the data system of FIG. 1 in accordance with some embodiments.

FIG. 4 is a block diagram illustrating examples of communications of the data system 100 of FIG. 1. In this example, control server 102 is operable to transmit network boot commands 402 to first and second compute servers 106 of cloud datacenter 107. The network boot commands 402 configure first and second compute servers 106 to boot from a network. For example, the network boot commands may include a configuration file that specifies a network boot setting, as well as a hostname (e.g., website) from which to obtain a bootable image, upon reboot.

Upon a reboot, each of first and second compute servers 106 may transmit first location request 404 and second location request 406, respectively, to web server 104. For example, upon reboot each of first and second compute servers 106 may parse the configuration file, determine that network boot is configured, and extract a hostname from which to obtain a bootable image from. Each of the first and second location requests 404, 406 may be a request for an IP address of the bootable images associated with the obtained hostname in the network boot commands, for example. In response to each of the first and second location requests 404, 406, web server 104 may identify an IP address associated with each of the respective host names. Web server 104 may then respond to each of the first and second location requests 404, 406 with first and second location responses 408, 410, respectively. Each of first and second location responses 408, 410 may identify an IP address associated with the respectively received hostnames. The IP address may be an IP address of boot image server 108, for example.

First compute server 106 may transmit a first image request 412 to boot image server 108. The first image request 412 may include a request for a hypervisor bootable image, such as hypervisor bootable image 302. In response, boot image server 108 may provide the requested hypervisor image in first image data 414. For example, boot image server 108 may transmit hypervisor bootable image 302 to first compute server 106 in first image data 414. First compute server 106 may parse first image data 414 to extract an executable hypervisor, and may execute the hypervisor.

Similarly, second compute server 106 may transmit a second image request 416 to boot image server 108. The second image request 416 may include a request for a hypervisor bootable image, such as hypervisor bootable image 302. In response, boot image server 108 may provide the requested hypervisor image in second image data 418. For example, boot image server 108 may transmit hypervisor bootable image 302 to second compute server 106 in second image data 418. Second compute server 106 may parse second image data 418 to extract an executable hypervisor, and may execute the hypervisor.

In some examples, the executed hypervisor may request one or more virtual machine images from boot image server 108. For example, first compute server 106 may request first VM image 312, second VM image 314, and third VM image 316 from boot image server 108. In response, boot image server 108 may obtain first VM image 312, second VM image 314, and third VM image 316 from database 116, and may transmit the VM images to first compute server 106. The executed hypervisor on first compute server 106 may run one or more of the corresponding first VM, second VM, and third VM.

Similarly, second compute server 106 may request first VM image 312, second VM image 314, and third VM image 316 from boot image server 108. In response, boot image server 108 may obtain first VM image 312, second VM image 314, and third VM image 316 from database 116, and may transmit the VM images to second compute server 106. The executed hypervisor on second compute server 106 may run one or more of the corresponding first VM, second VM, and third VM. In some examples, the VM images are stored in local memory. Upon a future reboot, if first or second compute server 106 fails in attempting to obtain VM images, first or second compute servers 106 may execute the locally stored VM images (e.g., failover).

Although only two compute servers 106 are illustrated in this example, cloud datacenter 107 may include any number of compute servers 106. As such, multiple compute servers 106 may be configured for network boot, thereby booting simultaneously or near simultaneously. For example, the multiple compute servers 106 may simultaneously or near simultaneously request bootable hypervisor images from boot image server 108, and boot off of the obtained bootable hypervisor images. Rather than hours or days, a datacenter with hundreds of compute servers may boot hypervisors within minutes.

Figure 5:
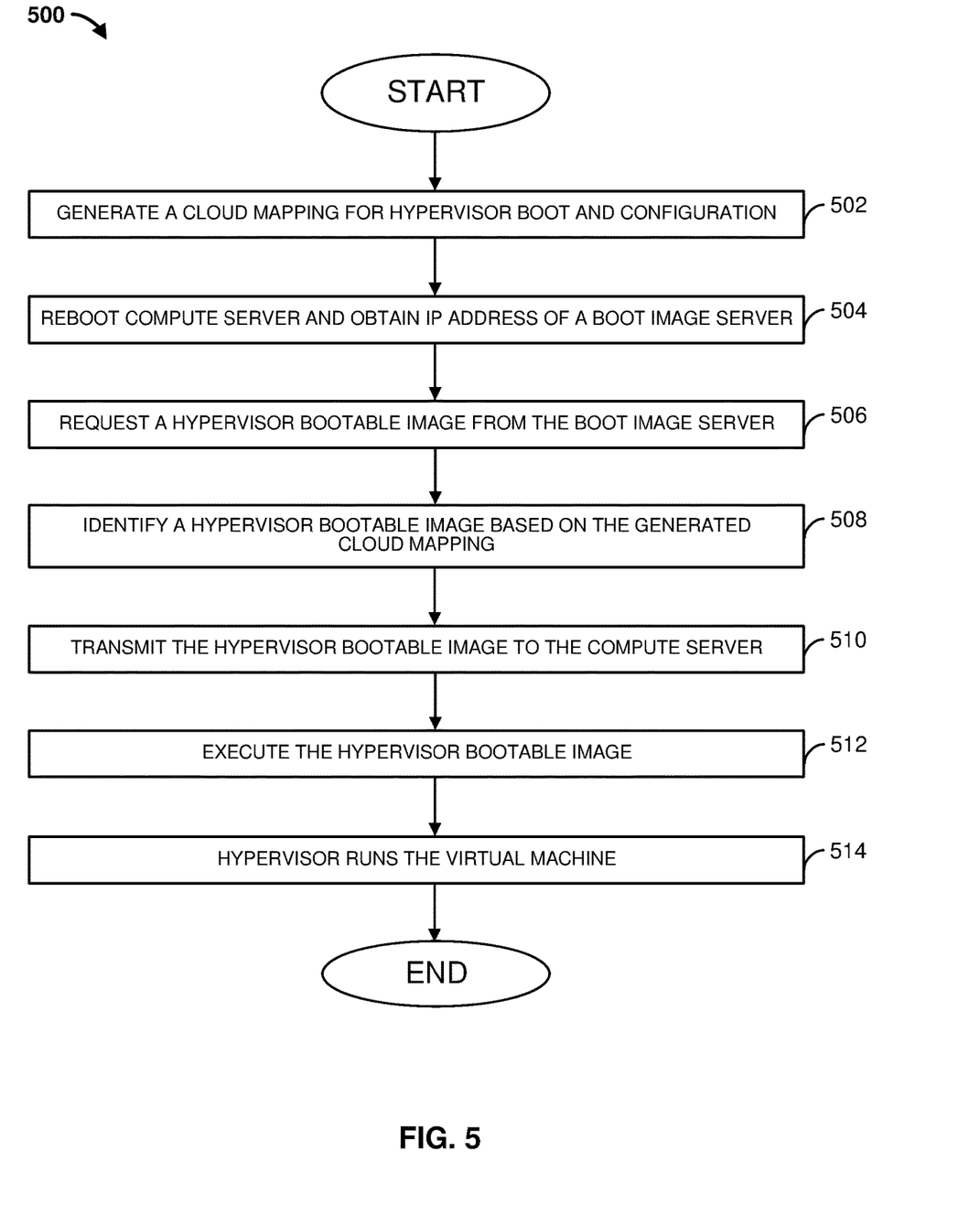
FIG. 5 is a flowchart of an example method that can be carried out by the data system of FIG. 1 in accordance with some embodiments.

FIG. 5 is a flowchart of an example method 500 that can be carried out by the data system 100 of FIG. 1. Beginning at step 502, a boot image server, such as boot image server 108, generates a cloud mapping for hypervisor boot and configuration. For example, the cloud mapping may map each of a plurality of hypervisors with a bootable hypervisor image. The cloud mapping may include generating a list of hypervisors associated with a cloud datacenter, a version of the hypervisor image to be booted, and any configuration files, such as cloud datacenter or host specific configuration files. At step 504, a compute server, such as compute server 106, reboots and obtains an IP address of the boot image server. At step 506, the compute server requests from the boot image server a hypervisor bootable image. Proceeding to step 508, the boot image server identifies a hypervisor bootable image in response to the received request based on the generated cloud mapping.

At step 510, the boot image server transmits the hypervisor bootable image to the compute server. At step 512, the compute server executes the hypervisor bootable image. In some examples, during execution of the hypervisor bootable image, the boot image server may configure disk volume using a set of physical disks to host VM instances data, and may mount the volume to a file system. All VMs may be hosted under the file system. In some examples, during execution of the hypervisor bootable image, the boot image server may retain the VM hosted data disk volume, and may remount it as part of a stateless compute post-configuration process. The hypervisor will be activated with the previously provisioned VMs. At step 514, the hypervisor runs the image for the virtual machine.

Figure 6:
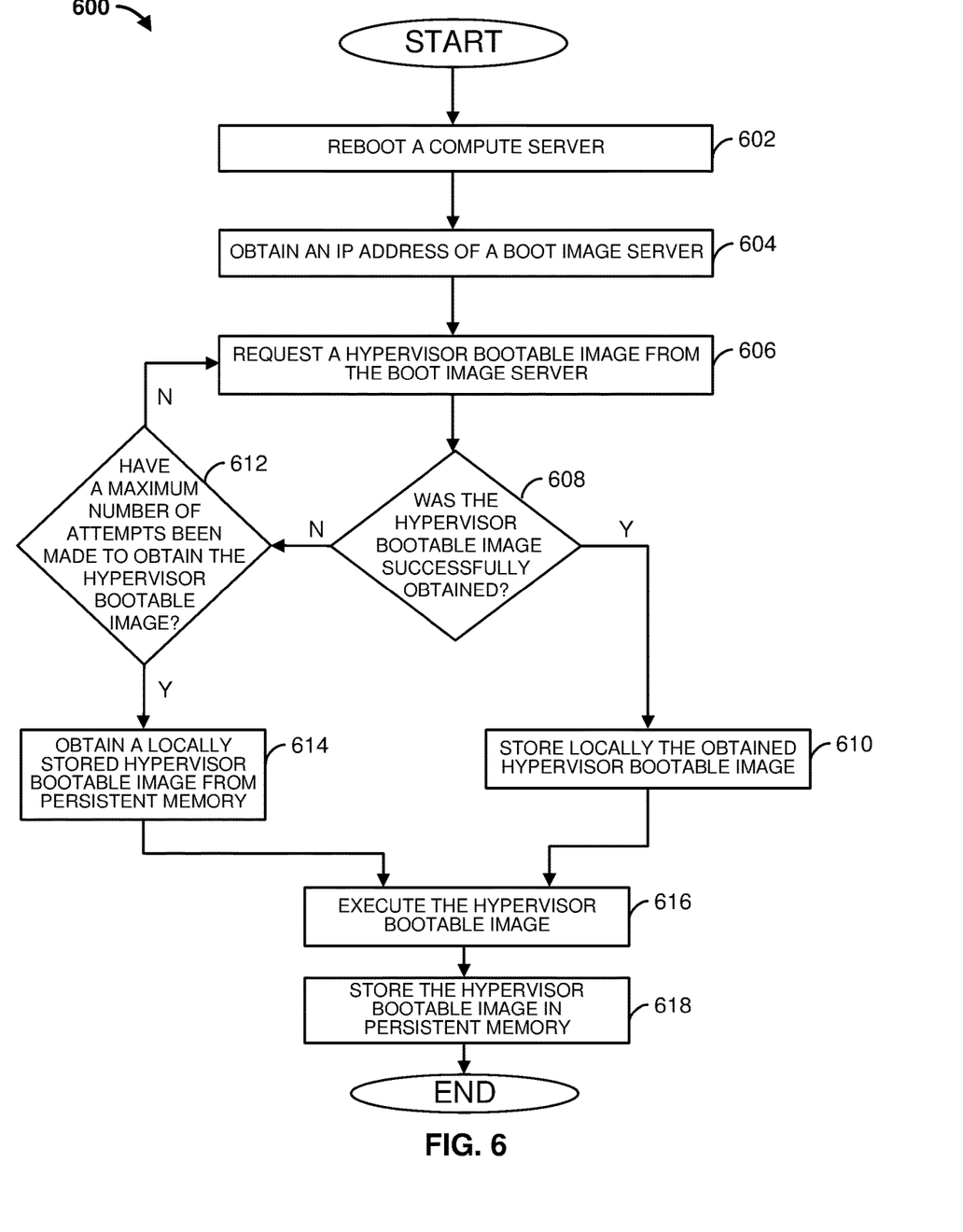
FIG. 6 is a flowchart of another example method that can be carried out by the data system of FIG. 1 in accordance with some embodiments.

FIG. 6 is a flowchart of another example method 600 that can be carried out by the data system 100 of FIG. 1. Beginning at step 602, a compute server, such as compute server 106, reboots. For example, control server 102 may transmit a command to compute server 106 to reboot. At step 604, the compute server obtains an IP address of a boot image server, such as the IP address of boot image server 108. Proceeding to step 606, the compute server requests a hypervisor bootable image from the obtained IP address. At step 608, a determination is made as to whether the hypervisor bootable image was successfully obtained. If the hypervisor bootable image was successfully obtained, the method proceeds to step 610 where the obtained hypervisor bootable image is locally stored. For example, the hypervisor bootable image may be stored in a non-volatile memory. If, however, the hypervisor bootable image was not successfully obtained, the method proceeds to step 612, where a determination is made as to whether a maximum number of attempts have been made to obtain the hypervisor bootable image.

If, at step 612, the maximum number of attempts have not yet been made to obtain the hypervisor bootable image, the method proceeds back to step 606. For example, a counter may be incremented to indicate another unsuccessful attempt in obtaining the hypervisor bootable image, and the counter may be compared to the maximum number of attempts to determine if the counter is less than the maximum number of attempts. If the counter is less than the maximum number of attempts, another request for the hypervisor bootable image may be made at step 606. Otherwise if, at step 612, the maximum number of attempts have been made, the method proceeds to step 614. At step 614, a locally stored hypervisor bootable image is obtained. For example, the locally stored hypervisor bootable image may be obtained from a persistent memory. The locally stored hypervisor bootable image may be the hypervisor bootable image most recently obtained.

Continuing from either step 610 or 614, the method proceeds to step 616 where the obtained hypervisor bootable image is executed. For example, if proceeding from step 614, the locally obtained hypervisor bootable image is executed. Otherwise, if proceeding from step 610, the hypervisor bootable image the obtained IP address is executed. In some examples, the executed hypervisor then runs one or more virtual machines. In some examples, the hypervisor transmits a message indicating that the virtual machine is available. For example, the hypervisor may transmit the message to control server 102. The method then proceeds to step 618, where the hypervisor bootable image is stored in local memory, such as a persistent memory. In some examples, the compute server may execute a post-configuration process including configuration of the cloud or host specific configuration. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising: a computing device configured to:
   generate a bootable image;
   store the bootable image in a bootable image server;
   configure a plurality of servers to boot from a network and to obtain, at boot up, the bootable image stored in the bootable image server;
   reboot the plurality of servers, the reboot causing the plurality of servers to simultaneously obtain a same bootable image that is the bootable image from the bootable image server, wherein the bootable image is a hypervisor bootable image configured to execute one or more virtual machines;
   wherein, in response to successfully obtaining the bootable image from the bootable image server, each of the plurality of servers is configured to execute the bootable image from the bootable image server, store the bootable image as a local bootable image in a local storage device, and transmit a request for virtual machine images to the bootable image server;
   in response to a threshold number of unsuccessful attempts of obtaining the bootable image from the bootable image server, obtain the local bootable image from the local storage device and execute the local bootable image from the local storage device, the local bootable image having been received from the bootable image server and stored in the local storage drive prior to the unsuccessful attempts, wherein the local bootable image transmits the request for virtual machine images to the bootable image server; and
   in response to receiving the request for virtual machine images, provide at least two virtual machine images to each of the plurality of servers, wherein each virtual machine image includes a virtual machine operating system, wherein each of the plurality of servers is configured to execute each of the at least two virtual machine images in response to receiving the provided at least two virtual machine images.

2. The system of claim 1, wherein the computing device is configured to configure the plurality of servers by transmitting a network boot command message to the plurality of servers comprising a boot setting to boot from the network.

3. The system of claim 2, wherein the network boot command message comprises an internet address of a web server from which to obtain the bootable image.

4. The system of claim 3, wherein rebooting the plurality of servers causes the plurality of servers to obtain the bootable image from the web server based on the internet address.

5. The system of claim 1, wherein generating the bootable image comprises:
   installing an operating system;
   installing server management software; and
   generating the bootable image based on the installed operating system and the installed server management software.

6. The system of claim 1, wherein the hypervisor transmits a message to the computing device indicating that the virtual machine is available.

7. A method comprising:
   generating a bootable image;
   storing the bootable image in a bootable image server;
   configuring a plurality of servers to boot from a network and to obtain, at boot up, the bootable image stored in the bootable image server;
   rebooting the plurality of servers, the reboot causing the plurality of servers to simultaneously obtain a same bootable image that is the bootable image from the bootable image server, wherein the bootable image is a hypervisor bootable image configured to execute one or more virtual machines;
   wherein, in response to successfully obtaining the bootable image from the bootable image server, each of the plurality of servers is configured to executing execute the bootable image from the bootable image server, store the bootable image as a local bootable image in a local storage device, and transmit a request for virtual machine images to the bootable image server;

in response to a threshold number of unsuccessful attempts of obtaining the bootable image from the bootable image server, obtaining the local bootable image from the local storage device and executing the local bootable image from the local storage device, the local bootable image having been received from the bootable image server and stored in the local storage drive prior to the unsuccessful attempts, wherein the local bootable image transmits the request for virtual machine images to the bootable image server; and in response to receiving the request for virtual machine images, providing at least two virtual machine images to each of the plurality of servers, wherein each virtual machine image includes a virtual machine operating system, wherein each of the plurality of servers is configured to execute each of the at least two virtual machine images in response to receiving the provided at least two virtual machine images.

8. The method of claim 7 further comprising transmitting a network boot command message to the plurality of servers comprising a boot setting to boot from the network.

9. The method of claim 8 wherein the network boot command message comprises an internet address of a web server from which to obtain the bootable image.

10. The method of claim 9 wherein rebooting the plurality of servers causes the plurality of servers to obtain the bootable image from the web server based on the internet address.

11. The method of claim 7 wherein generating the bootable image comprises:
  installing an operating system;
  installing server management software; and
  generating the bootable image based on the installed operating system and the installed server management software.

12. The method of claim 7 wherein the hypervisor transmits a message indicating that the virtual machine is available.

13. A non-transitory computer readable medium having instructions stored thereon, wherein the instructions, when executed by at least one processor, cause a device to perform operations comprising:
  generating a bootable image;
  storing the bootable image in a bootable image server;
  configuring a plurality of servers to boot from a network and to obtain, at boot up, the bootable image stored in the bootable image server;
  rebooting the plurality of servers, the reboot causing the plurality of servers to simultaneously obtain a same bootable image that is the bootable image from the bootable image server, wherein the bootable image is a hypervisor bootable image configured to execute one or more virtual machines;
  wherein, in response to successfully obtaining the bootable image from the bootable image server, each of the plurality of servers is configured to executing execute the bootable image from the bootable image servers store the bootable image as a local bootable image in a local storage device, and transmit a request for virtual machine images to the bootable image server;
  in response to a threshold number of unsuccessful attempts of obtaining the bootable image from the bootable image server, obtaining the local bootable image from the local storage device and executing the local bootable image from the local storage device, the local bootable image having been received from the bootable image server and stored in the local storage drive prior to the unsuccessful attempts, wherein the local bootable image transmits the request for virtual machine images to the bootable image server; and
  in response to receiving the request for virtual machine images, providing at least two virtual machine images to each of the plurality of servers, wherein each virtual machine image includes a virtual machine operating system, wherein each of the plurality of servers is configured to execute each of the at least two virtual machine images in response to receiving the provided at least two virtual machine images.

14. The non-transitory computer readable medium of claim 13 further comprising instructions stored thereon that, when executed by at least one processor, further cause the device to perform operations comprising:
  transmitting a network boot command message to the plurality of servers comprising a boot setting to boot from the network.

15. The non-transitory computer readable medium of claim 14 wherein:
  the network boot command message comprises an internet address of a web server from which to obtain the bootable image; and
  rebooting the plurality of servers causes the plurality of servers to obtain the bootable image from the web server based on the internet address.

* * * * *

UNITED STATES PATENT AND TRADEMARK OFFICE
CERTIFICATE OF CORRECTION

PATENT NO. : 11,762,666 B2  
APPLICATION NO. : 16/260625  
DATED : September 19, 2023  
INVENTOR(S) : Satheesh Kumar Ulaganathan et al.

It is certified that error appears in the above-identified patent and that said Letters Patent is hereby corrected as shown below:

In the Claims

Claim 7, Column 10, Line 67, delete "executing"

Claim 13, Column 12, Line 12, delete "executing"

Claim 13, Column 12, Line 13, delete "servers" and insert --server,--

Signed and Sealed this
Twenty-fourth Day of October, 2023

Katherine Kelly Vidal
*Director of the United States Patent and Trademark Office*